(12) United States Patent
Lundström et al.

(10) Patent No.: US 10,907,237 B2
(45) Date of Patent: *Feb. 2, 2021

(54) METHOD FOR RECOVERING GOLD

(71) Applicant: OUTOTEC (FINLAND) OY, Espoo (FI)

(72) Inventors: Mari Lundström, Helsinki (FI); Riina Ahtiainen, Pori (FI); John O'Callaghan, Victoria (AU)

(73) Assignee: OUTOTEC (FINLAND) OY, Espoo (FI)

( * ) Notice: Subject to any disclaimer, the term of this patent is extended or adjusted under 35 U.S.C. 154(b) by 218 days.

This patent is subject to a terminal disclaimer.

(21) Appl. No.: 15/770,534

(22) PCT Filed: Oct. 27, 2016

(86) PCT No.: PCT/FI2016/050752
§ 371 (c)(1),
(2) Date: Apr. 24, 2018

(87) PCT Pub. No.: WO2017/072411
PCT Pub. Date: May 4, 2017

(65) Prior Publication Data
US 2019/0055623 A1 Feb. 21, 2019

(30) Foreign Application Priority Data
Oct. 29, 2015 (FI) .................................... 20155768

(51) Int. Cl.
C22B 11/02 (2006.01)
C22B 3/00 (2006.01)
C22B 3/24 (2006.01)
C22B 3/04 (2006.01)

(52) U.S. Cl.
CPC ............... *C22B 11/04* (2013.01); *C22B 3/04* (2013.01); *C22B 3/24* (2013.01); *C22B 11/02* (2013.01); *Y02P 10/20* (2015.11)

(58) Field of Classification Search
CPC ........... C22B 3/24; C22B 11/04; C22B 11/06; C22B 11/02
See application file for complete search history.

(56) References Cited

U.S. PATENT DOCUMENTS

| | | | |
|---|---|---|---|
| 4,289,532 A | 9/1981 | Matson et al. | |
| 4,723,998 A | 2/1988 | O'Neil | |
| 7,060,121 B2* | 6/2006 | Lin | B22F 1/0018 75/362 |
| 8,388,730 B2 | 3/2013 | Abe et al. | |
| 10,669,608 B2* | 6/2020 | Lundstrom | C22B 11/06 |
| 2009/0158894 A1 | 6/2009 | Haavanlammi et al. | |

FOREIGN PATENT DOCUMENTS

| | | |
|---|---|---|
| CA | 2 861 419 A1 | 7/2013 |
| CN | 101120106 A | 2/2008 |
| CN | 101120107 A | 2/2008 |
| CN | 101384737 A | 3/2009 |
| CN | 104968810 A | 10/2015 |
| EP | 0 081 310 A2 | 6/1983 |
| NZ | 260 110 A | 7/1995 |
| WO | WO 2005/106052 A1 | 11/2005 |
| WO | 2006/087412 A1 | 8/2006 |
| WO | 2006/087413 A1 | 8/2006 |
| WO | 2013/108478 A1 | 7/2013 |
| WO | 2014/053705 A1 | 4/2014 |

OTHER PUBLICATIONS

Greaves et al. "The Recovery of Gold from Refractory Ores by the Use of Carbon-in-Chlorine Leaching." JOM. September (pp. 12-14). (Year: 1990).*
Gibbs, H. D. "The Production of Hydrochloric Acid from Chlorine and Water." The Journal of Industrial and Engineering Chemistry. vol. 12, No. 6. pp. 538-541. June (Year: 1920).*
Zhou et al. "Gold Process Mineralogy: Objectives, Techniques, and Applications." JOM. pp. 49-52. July (Year: 2004).*
Batric Pesic, et al., "Adsorption of Gold on Activated Carbon in Bromide Solutions", Metallurgical Transactions B. Process Metallurgy, Metallurgical Society of Aime., Oct. 1, 1992, pp. 557-566, vol. 23B, No. 5, New York, U.S.A.
Finnish Search Report of Finnish Patent Application No. 20155768, dated Mar. 11, 2016.
International Search Report (PCT/ISA/210) dated Jan. 13, 2017, by the European Patent Office as the International Searching Authority for International Application No. PCT/FI2016/050752.
Written Opinion (PCT/ISA/237) dated Jan. 13, 2017, by the European Patent Office as the International Searching Authority for International Application No. PCT/FI2016/050752.

(Continued)

*Primary Examiner* — Jophy S. Koshy
(74) *Attorney, Agent, or Firm* — Buchanan Ingersoll & Rooney PC

(57) ABSTRACT

Provided is a method of recovering gold, and optionally silver, from gold-bearing, and optionally silver-bearing, double refractory raw material, comprising the steps of (a) leaching the gold-bearing, and optionally silver-bearing, double refractory raw material in a chloride containing leaching solution to dissolve gold and to obtain a leach solution comprising gold, and optionally silver, in solution, whereby the redox of leaching solution in the chloride leaching step is above 550 mV vs. Ag/AgCl; and simultaneously contacting the leach solution comprising gold, and optionally silver, in solution with a re-sorptive material to obtain a gold-containing, and optionally silver-containing, re-sorptive material; and (b) recovering gold and optionally silver from the gold-containing, and optionally silver-containing, re-sorptive material.

16 Claims, 3 Drawing Sheets

(56) References Cited

OTHER PUBLICATIONS

Notification of the First Office Action issued by the State Intellectual Property Office of the People's Republic of China in corresponding Chinese Patent Application No. 201680062709.1 dated Feb. 26, 2019 (10 pages with partial English translation).

* cited by examiner

METHOD FOR RECOVERING GOLD

FIELD OF THE INVENTION

The present invention relates to a method of recovering gold, and more particularly to recovery of gold from gold-bearing double refractory materials.

BACKGROUND OF THE INVENTION

Currently gold ores, concentrates, oxidation residues and calcines are almost exclusively subjected to cyanide leaching for recovery of gold. However, cyanide solution cannot break up sulfide structures such as pyrite and/or arsenopyrite, thus all refractory sulfidic materials need to be oxidized before leaching usually by roasting, bio-oxidation, or wet pressure oxidation.

Development stage gold chloride leaching processes generally use high concentrations of chloride, typically with a bromide addition and an oxidant (such as $Cu^{2+}$) present. This is in order to dissolve gold and to keep gold stable in the solution. This may cause high operating costs and increasingly complex chemistry in the process.

These state of the art gold leaching processes typically fail in recovering gold from gold-bearing double refractory materials. Gold-bearing double refractory materials e.g. gold-bearing materials comprising carbonaceous or other preg-robbing matter in addition to sulfide structures such as pyrite and/or arsenopyrite. In refractory ores and concentrates gold particles are in locked within a matrix, most commonly sulfide minerals and pretreatment is necessary to decompose the mineral structure to liberate gold for subsequent recovery. Preg-robbing matter, typically carbonaceous amorphous carbon, naturally occurring graphite, clay or other reducing component, on the other hand acts as a preg-robber during leaching and therefore has to be eliminated or passivated before gold dissolution as it results in the loss of gold from solution. One possible remedy is to roast the ore and thus oxidize the pyrite and remove the organic carbon.

The pretreatment processes presently used on refractory ores include roasting, pressure oxidation, and bio-oxidation such as bacterial oxidation.

BRIEF DESCRIPTION OF THE INVENTION

It is thus an object to provide a method so as to solve the above problems and provide a viable method for recovering gold from gold-bearing double refractory raw materials. The objects of the invention are achieved by a method and an arrangement, which are characterized by what is stated in the independent claims. The preferred embodiments of the invention are disclosed in the dependent claims.

The invention is based on the idea of based on the realization that gold can be recovered from gold-bearing double refractory raw materials by leaching the said raw material in a chloride environment in a leaching stage in the presence of a re-sorptive material which is able to capture, e.g. reduce, precipitate and/or absorb, dissolved gold from leaching solution so as to prevent preg-robbing on the raw material.

The method of the present invention does not require a pre-treatment process, such as roasting, pressure oxidation, or bio-oxidation for being able to recover gold from the said raw material and high gold recovery can be achieved from gold-bearing double refractory materials. Furthermore, the method allows gold recovery without toxic cyanide in closed chemical circulation minimizing bleed to the environment.

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
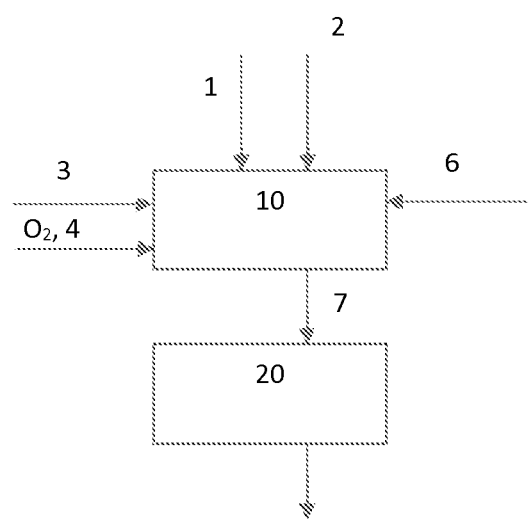
FIG. 1 is shows a flow diagram of a gold recovery process illustrating a first example of the invention.

The present invention provides a method for recovery of gold, and optionally silver, from gold-bearing, and optionally silver-bearing, double refractory raw materials. The method comprises the steps of (a) leaching the said gold-bearing, and optionally silver-bearing, double refractory raw material in a chloride containing leaching solution to dissolve gold and to obtain a leach solution comprising gold, and optionally silver, in solution, whereby the redox of leaching solution in the chloride leaching step is above 550 mV vs. Ag/AgCl; and simultaneously contacting the said leach solution comprising gold, and optionally silver, in solution with a re-sorptive material to obtain a gold-containing, and optionally silver-containing, re-sorptive material; and (b) recovering gold and optionally silver from the said gold-containing, and optionally silver-containing, re-sorptive material.

The term "double refractory raw material" as used herein and hereafter refers to the presence of both (i) gold locking or cyanide consuming matters, such as iron sulfides (e.g. pyrite, marcasite, pyrrhotite), arsenic sulfides (e.g. arsenopyrite, orpiment, realgar), copper sulfides (e.g. chalcopyrite), antimony sulfides (e.g. aurostibnite, stibnite), tellurides, elemental sulfur, or any mixture thereof, and (ii) preg-robbing material, such as carbonaceous amorphous, graphitic carbon, other carbonaceous matter, clay or other adsorption/reducing component, or any mixtures thereof, in said raw material. Said raw material typically comprises at least 0.01% w/w, in particular at least 0.5% w/w, preferably at least 1% w/w, preg-robbing matter, that decreases gold recovery, of the total weight of the raw material. Further the said raw material in particular comprises refractory matter having low gold liberation making the process uneconomical using direct cyanidation. Said raw material typically comprises less than 80%, in particular less than 50%, preferably less than 35%, more preferably less than 25%, even more preferably 10 to 0% native gold of the total gold in the said raw material. The term "native gold" refers to free milling gold as opposite to gold locked in the material e.g. in iron sulfides.

The term "preg-robbing" as used herein and hereafter refers to redeposition, reduction, and/or adsorption of gold dissolved from the host material onto the preg-robbing matter surface, e.g. amorphous carbon surface of the materials and thus to its loss from solution and remaining with the gangue and/or the leach residue.

In particular the present invention is suitable for the recovery of gold and optionally silver form a material comprising double refractory gold-bearing raw material, in particular double refractory gold-bearing raw material. Generally said gold-bearing double refractory raw material is or is derived from ore or concentrate, wherein the main mineral is pyrite or arsenopyrite. In addition, double refractory material can be also secondary raw material. The said double refractory raw material may for example be ore, concentrate, tailings, oxidation residue, intermediate or other gold-bearing double refractory material, or any mixture thereof. The material can be fine ground, however it is not necessary. In addition to gold and optional silver, the said raw material may comprise further other elements e.g. copper, nickel, cobalt, zinc, iron, lead, aluminum, silicon and/or sulfur.

In accordance with the present invention the gold-bearing, and optionally silver-bearing, double refractory raw material is not pre-oxidized for gold liberation before the leaching step (a) by any of the following: roasting, pressure oxidation, and bio-oxidation such as bacterial oxidation.

FIG. 1 shows an example of a process flow of a gold recovery process. Gold-bearing double refractory material 1 is fed into a gold leaching step (a) 10 wherein the material 1 is leached under atmospheric or slightly pressurized conditions in the presence of re-sorptive material 2 which is able to capture, e.g. absorb, reduce, and/or precipitate, dissolved gold from leaching solution. In the following the method is discussed with reference to FIG. 1.

Leaching in step (a) 10 may be performed in particular under total pressure consisting of hydrostatic and atmospheric pressure. Optionally small overpressure can be used. Typically at the top of the reactor over pressure is less than 0.5 bar. The temperature of the leaching step (a) 10 is at or below the boiling point of the leaching solution, advantageously from 70 to 105° C., preferably from 90 to 100° C. The temperature of the leaching step (a) 10 may locally rise above the boiling point of the leaching solution due to hydrostatic pressure.

Leaching in step (a) 10 is performed in a leaching solution 3 which comprises chloride ions. The total chloride concentration of the leaching solution is typically from 100 to 450 g/L, preferably from 130 to 250 g/L, more preferably from 150 to 225 g/L. The desired chloride concentration may vary based on initial chemical and dissolved metal content of the raw material and is thus suitably adjusted according to the need of gold-capturing complexation agent as which the chloride ions act. Said chloride ions are typically provided into the leaching solution in form of chloride salts e.g. NaCl and $CaCl_2$.

In some prior art gold leaching processes bromide ions are added to the solution to retain gold more stable as a gold bromide complex. With the method of the present invention, it is not necessary to add bromide ions to the leaching solution. However, their presence in the leaching step is tolerated. In a preferred example of the present invention the leaching step (a) 10 is performed in the absence of added bromide ions. Typically the concentration of bromide ions in the chloride containing leaching solution is from 0 to 100 g/L, more preferably from 0 to 25 g/L, most preferably 0 g/L.

The redox potential of the leaching solution in the leaching step (a) 10 is adjusted to the level where the refractory matrix can be destructed i.e. over 550 mV vs. Ag/AgCl, in particular over 580 mV vs. Ag/AgCl, preferably from 600 to 720 mV vs. Ag/AgCl. The oxidizing conditions are typically achieved by the presence of an oxidizing agent, typically cupric and/or ferric ions. A feed of an oxygen containing gas 4, such as oxygen, air or oxygen enriched air, is additionally provided to keep typically copper and/or iron oxidized and thus in solution.

pH in the leaching step (a) 10 is advantageously kept below the precipitation limit for cupric and/or ferric, typically from 1 to 3, more preferably from 1.5 to 2.6, in order to further keep copper and/or iron soluble. The total concentration of dissolved cupric and/or ferric ions in the chloride containing leaching solution 3 is typically above 20 g/L, preferably from 30 to 120 g/L, more preferably from 60 to 100 g/L. No strong oxidants such as hydrogen peroxide, nitric acid or chlorine gas are required in the leaching step (a) of the present invention, but the refractory material is oxidized in the means of cupric and/or ferric ions oxidized by the oxidizing gas.

In accordance with the present invention the leaching step (a) 10 is performed in the presence of a re-sorptive material 2 which is able to capture, e.g. absorb, reduce and/or precipitate dissolved gold from the leaching solution. The presence of a re-sorptive material is required due to the fact that gold chloride complexes likely have a very low stability in the leaching conditions and need to be recovered as soon as possible on the re-sorptive material. Otherwise gold will precipitate back on the raw material, materials of construction or other surface, even in the absence of preg-robbing material in the said raw material.

Typically the re-sorptive material 2 is selected from carbon comprising chemicals and materials, preferably from a group consisting of activated carbon, resin, organic solvents, organic substances such as wood, coal and fibre, inorganic carbon, rubber, plastics, biopolymers, and any combinations thereof.

In a typical example of the present invention the re-sorptive material is activated carbon. The advantage of activated carbon is the high area for adsorption/reduction/precipitation, high affinity for gold in chloride media, good availability and low price compared to many other sorbents.

In another example of the present invention the re-sorptive material is a plastic such as a polymer resin. An example of a polymer resin suitable for recovery of gold is a gold selective resin such as a polystyrene resin. In such a polystyrene resin gold is adsorbed onto solid spherical polystyrene resin beads rather than activated carbon grains. Another example of suitable ion exchange resin includes resins comprising piperazine functionalities.

Figure 3:
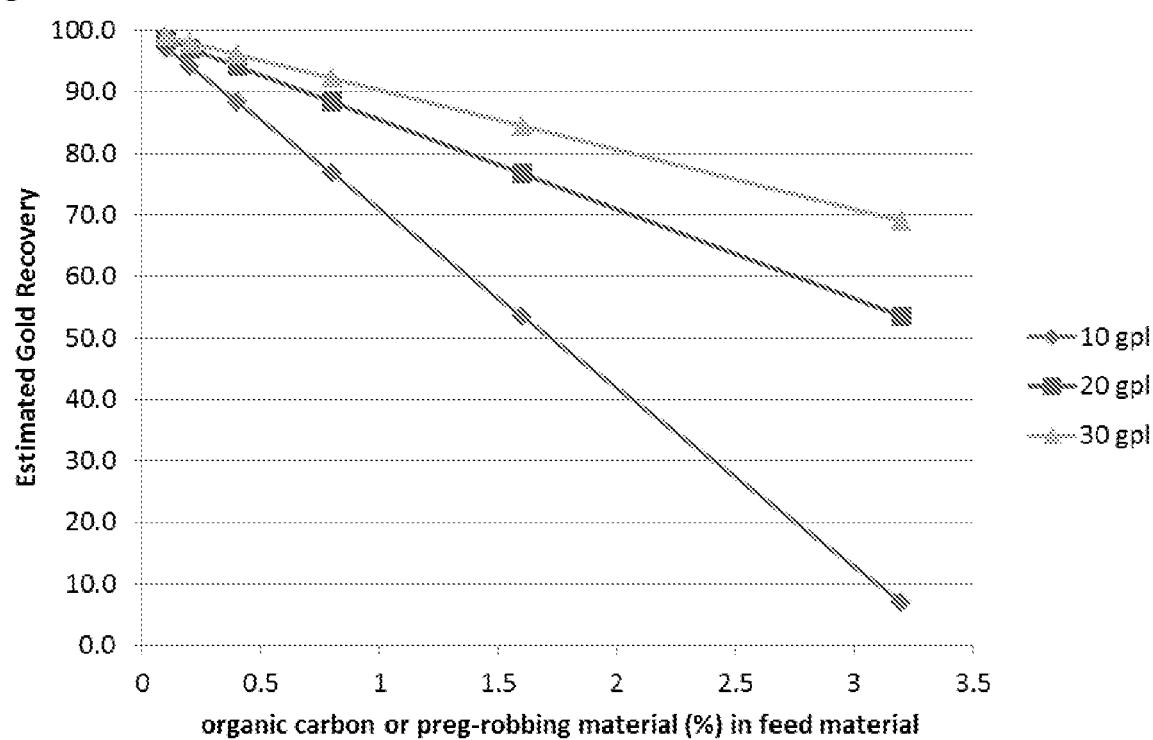
FIG. 3 illustrates estimated gold recovery with various activated carbon concentrations (10 to 30 g/L) as a function of organic carbon per preg-robbing material concentration in the raw material (g/L).

The amount of the re-sorptive material 2 added to the leaching solution is dependent on the amount of gold to be recovered and/or concentration of preg-robbing material in the gold-bearing raw material and/or the gold dissolution rate. Estimated gold recovery with various concentration of activated carbon (10 to 30 g/L) as a function of concentration of the preg-robbing material is shown in FIG. 3. Preferably the concentration of the re-sorptive material is at least 5 g/L, preferably at least 10 g/L, more preferably 20 to 80 g/L in the leaching solution.

With reference to FIG. 1, the gold-bearing, and optionally silver-bearing, the gold-bearing re-sorptive material 7 is subjected to a gold (and silver) recovery step (b) 20 for recovery of gold, and optionally silver, from the said re-sorptive material.

Gold can be recovered from the gold-bearing re-sorptive material 7 by known methods. Gold may be recovered from the re-sorptive material 7 for example pyrometallurgically, by eluation, by stripping, or by leaching gold from the pyrometallurgically received ash.

Preferably gold is recovered from the gold-bearing re-sorptive material 7 pyrometallurgically. Pyrometallurgical recovery of gold from the gold-bearing re-sorptive material 7 is typically achieved by burning the gold-bearing re-sorptive material to obtain in a gold, and optionally silver, rich dore. The resulting burned re-sorptive material may optionally be leached or eluted to ensure full recovery of gold and optional silver.

Silver, if present, is leached in the presence of chloride and recovered simultaneously at least partly with gold on the re-sorptive material. Silver can be recovered from the re-sorptive material together with gold by the methods discussed for recovering gold. Silver remaining the leaching solution can be recovered with conventional methods known to a skilled person such as precipitation, cementation, reduction, solvent extraction, or ion exchange.

EXAMPLES

Example 1

A test pattern to demonstrate the effect of the method of the present invention compared to prior art method was carried out. A double refractory gold concentrate i.e. concentrate wherein gold is mainly locked in the sulfide minerals with reasonable organic carbon in the ore decreasing gold recovery (preg-robbing) was used. Table 1 presents the chemical composition of the double refractory gold concentrate.

TABLE 1

Chemical composition

|  | Concentrate |
| --- | --- |
| Au, ppm | 38.7 |
| Ag, ppm | 40.0 |
| Al, % | 3.7 |
| As, % | 6.1 |
| $C_{tot}$, % | 3.6 |
| Ca, % | 3.0 |
| Fe, % | 22.5 |
| S, % | 20.1 |

The example shows the effect of the re-sorptive material (activated carbon) in chloride leach on the preg-robbing intensity of a refractory gold material. The test parameters are listed in Table 2. Arsenopyrite and pyrite were destructed by chloride leaching (test 1 and 2). In test 3, gold was liberated beforehand by pressure oxidation (PDX) i.e. first acid treated at pH 2 at 60° C., then oxidized in PDX (225° C., oxygen over pressure 7 bar) and finally after oxidation, pressure was dropped to atmospheric and temperature to 90° C. (hot cure treatment). A constant oxygen feed was provided during all three experiments.

TABLE 2

Leaching test conditions

| Test | $[Cu^{2+}]_{aq, 0}$ g/L | $[Cl^-]_{aq, 0}$ g/L | T °C. | $[HCl]_{aq}$ g/L | pH | t h | [Act. C] g/L |
| --- | --- | --- | --- | --- | --- | --- | --- |
| 1 | 100 | 225 | 98 | — | 1.7 | 60 | — |
| 2 | 100 | 225 | 98 | — | 1.7 | 40 | 25 |
| 3 | 15 | 150 | 98 | 10 | — | 24 | — |

Figure 2:
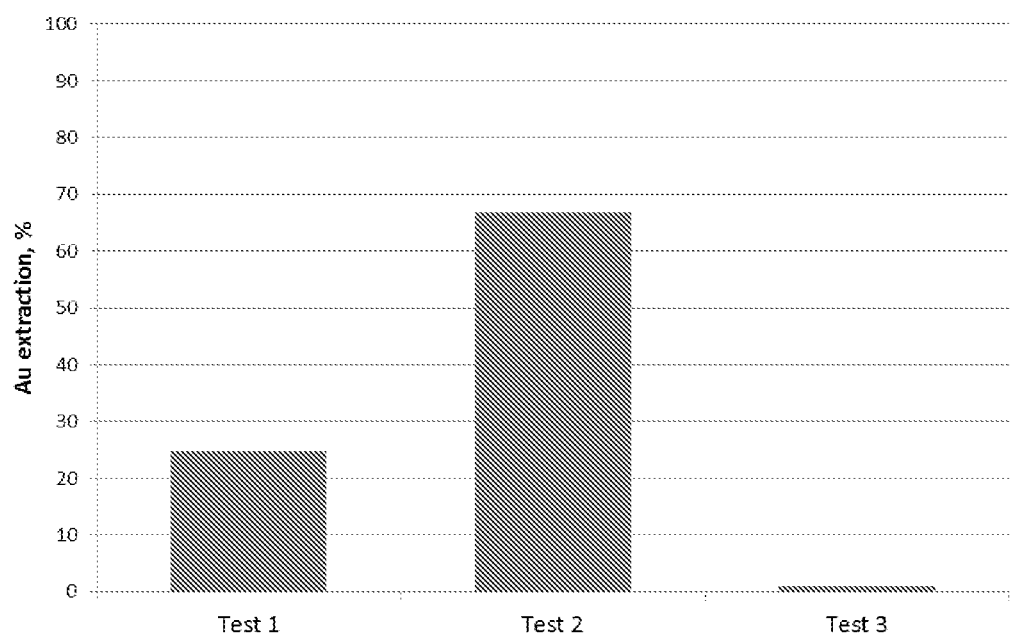
FIG. 2 shows gold recovery from a double refractory raw material with conventional chloride leaching methods and the method of the present invention.

The gold recoveries of the comparative leaching tests are shown in FIG. 2.

It can be seen from FIG. 2 that leaching of a double refractory raw material directly by chloride solution (Test 1) a gold recovery rate of 25% was achieved. When the same material was first oxidized by pressure oxidation and then leached, the gold recovery rate was even lower (1%, Test 3). This shows that even strong chloride solution cannot keep gold stable in the leaching solution in the presence of double refractory raw material. Similar results were obtained with other state of the art chloride leaching processes.

By the method of the present invention (Test 2), remarkably high gold reveries (>65%) was achieved in similar leaching solution as used for the comparison test and even without bromide.

Example 2

The effect of a re-sorptive material on gold recovery was estimated carrying our statistic calculations. The calculations have been made with the assumption that activity of the preg-robbing material is 50% of the activity of the activated carbon, solid density is 40% and aqueous phase density is 1.1 t/m$^3$. The results are shown in FIG. 3.

FIG. 3 shows that if there is 1% of organic carbon in the ore and the organic carbon has preg-robbing activity 50% that of activated carbon, the estimated gold recovery is 92%, 88%, and 78% with re-sorptive material concentrations 30 g/L, 20 g/L and 10 g/L, respectively, when activated carbon is utilized as the re-sorptive material. This shows that by increasing the re-sorptive material concentration in the leaching solution, the likelihood of preg-robbing can be decreased.

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering gold, and optionally silver, from a gold-bearing, and optionally silver-bearing, double refractory raw material, comprising the steps of
   (a) leaching the gold-bearing, and optionally silver-bearing, double refractory raw material in a chloride containing leaching solution to dissolve gold, and optionally silver, and to obtain a leach solution comprising gold, and optionally silver, in solution, wherein a redox potential of the leaching solution in the leaching step is above 550 mV to 720 mV vs. Ag/AgCl, achieved by a presence of cupric and/or ferric ions, and a feed of an oxygen containing gas; and
   simultaneously contacting the leach solution comprising gold, and optionally silver, in solution with a re-sorptive material to obtain a gold-containing, and optionally silver-containing, re-sorptive material; and
   (b) recovering gold, and optionally silver, from the gold-containing, and optionally silver-containing, re-sorptive material.

2. The method as claimed in claim 1, wherein the gold-bearing, and optionally silver-bearing, double refractory raw material comprises at least 0.01% w/w preg-robbing matter.

3. The method as claimed in claim 1, wherein the gold-bearing, and optionally silver-bearing, double refractory raw material comprises less than 80%-native gold of the total gold in the said raw material.

4. The method as claimed in claim 1, wherein the re-sorptive material is selected from the group consisting of activated carbon, resin, organic solvents, organic substances, inorganic carbon, rubber, plastics, biopolymers, and combinations thereof.

5. The method as claimed in claim 1, wherein the re-sorptive material is activated carbon.

6. The method as claimed in claim 1, wherein the concentration of the re-sorptive material is at least 5 g/L in the leaching solution.

7. The method as claimed in claim 1, wherein the total chloride concentration of the leaching solution is from 100 to 450 g/L.

8. The method as claimed in claim 1, wherein the chloride containing leaching solution contains dissolved copper and/or iron ions in a concentration that is from above 20 to 120 g/L.

9. The method as claimed in claim 1, wherein the leaching step (a) is performed in the absence hydrogen peroxide and nitric acid.

10. The method as claimed in claim 1, wherein pH in the leaching step (a) is below a precipitation limit for cupric and/or ferric.

11. The method as claimed in claim 1, wherein the leaching step (a) is conducted in an oxidation-reduction potential above 580.

12. The method as claimed in claim 1, wherein gold is recovered from the gold-bearing re-sorptive material pyrometallurgically, by eluation, by stripping, or by leaching gold from a pyrometallurgically received ash.

13. The method as claimed in claim 1, wherein a reactor is used in the leaching step (a), where over pressure at the top of the reactor is less than 0.5 bar.

14. The method as claimed in claim 1, wherein the temperature of the leaching step (a) is at or below the boiling point of the leaching solution.

15. The method as claimed in claim 1, wherein the leaching step (a) is performed in the absence added of bromide ions.

16. The method as claimed in claim 1, wherein the chloride containing leaching solution contains bromide ions in a concentration that is from 0 to 100 g/L.

* * * * *